United States Patent [19]

Schwartzman

[11] Patent Number: 4,790,700

[45] Date of Patent: Dec. 13, 1988

[54] INTEGRAL SPRING FLEXURE FOR USE WITH HIGH SPEED ROTATING SHAFTS

[76] Inventor: Everett H. Schwartzman, 2751 Toledo St., Ste. 309, Torrance, Calif. 90503

[21] Appl. No.: 940,948

[22] Filed: Dec. 12, 1986

Related U.S. Application Data

[63] Continuation-in-part of Ser. No. 635,716, Jul. 30, 1984, Pat. No. 4,640,653.

[51] Int. Cl.$^4$ ............................ B23Q 3/12; F16F 1/02
[52] U.S. Cl. ...................................... 409/233; 267/181
[58] Field of Search .................. 409/231, 232, 233; 267/69, 72, 162, 165, 181

[56] References Cited

FOREIGN PATENT DOCUMENTS

| | | | |
|---|---|---|---|
| 110233 | 6/1984 | European Pat. Off. | 267/181 |
| 2143798 | 3/1973 | Fed. Rep. of Germany | 267/181 |
| 2501397 | 11/1975 | Fed. Rep. of Germany | 267/181 |
| 391306 | 12/1973 | U.S.S.R. | 267/181 |

Primary Examiner—Gil Weidenfeld
Assistant Examiner—Daniel W. Howell
Attorney, Agent, or Firm—Beehler, Pavitt, Siegemund, Jagger, Martella & Dawes

[57] ABSTRACT

This invention relates to an improved integral machined spring adapted to be used in high speed spindles employing a tool holding mechanism which rotates with the spindle. The spring assembly includes a plurality of lands and slots arranged circumferentially and in tiers and includes a top and bottom face. The axial width dimension of the slots adjacent to the end faces is less than the axial dimension of the slots between the end faces in order to distribute the stresses more uniformly. The lands form a plurality of circumferentially arranged lobes whose radial dimension is greater than the portion between the lobes, again to distribute the stresses more uniformly. Various forms of the invention are described including a spindle assembly having a non-rotating actuating rod.

9 Claims, 4 Drawing Sheets

FIG. 3B (SECTION A-A OF FIG. 3)

FIG. 3 (METAL DIAPHRAGM)

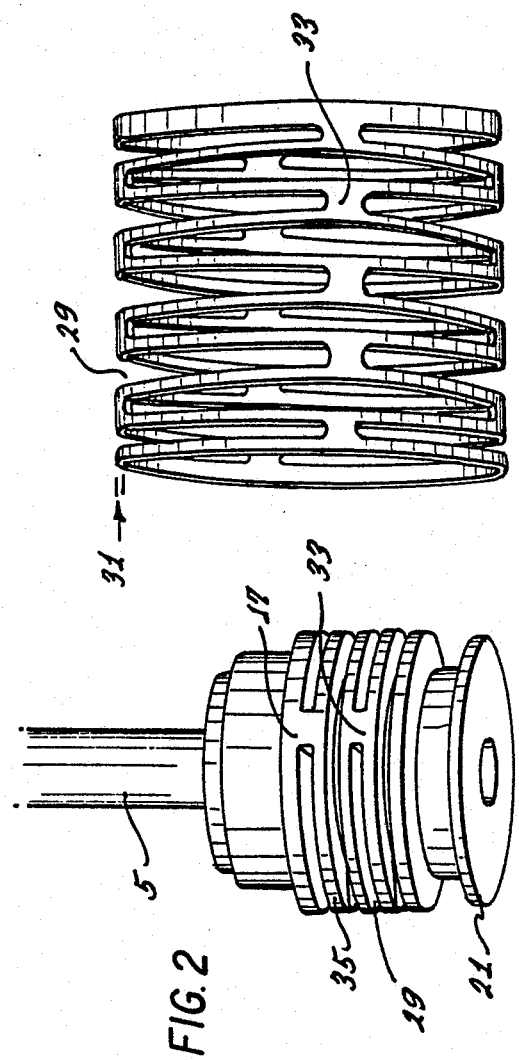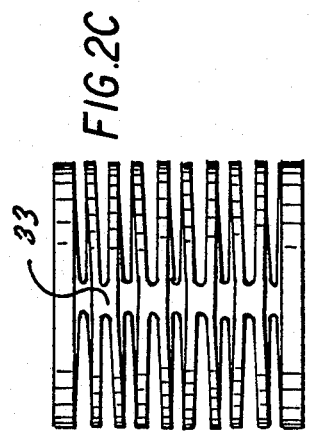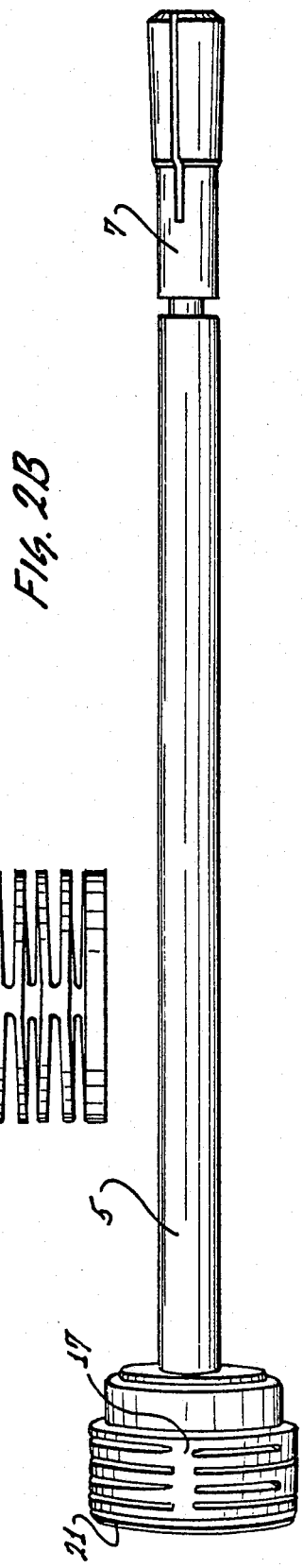

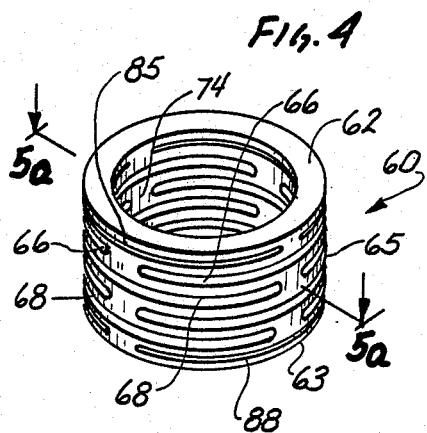
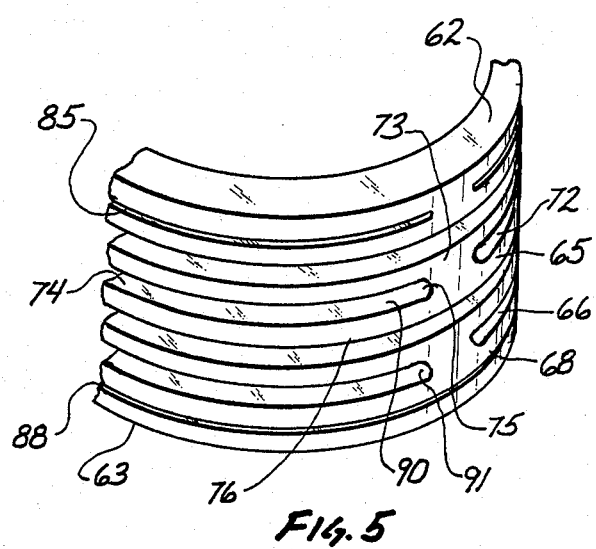
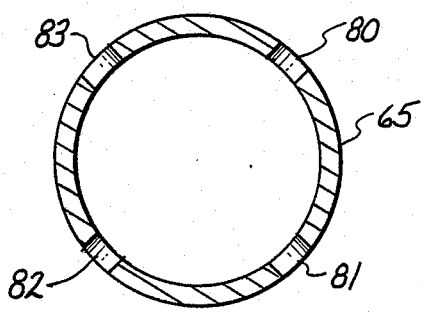
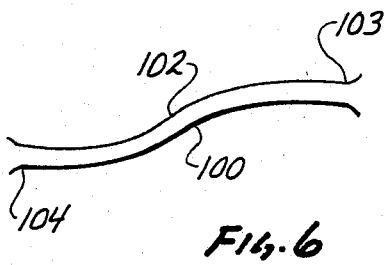
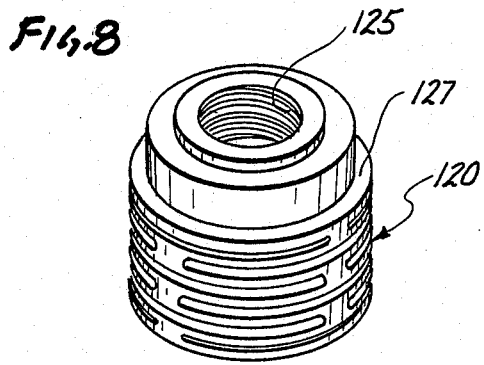
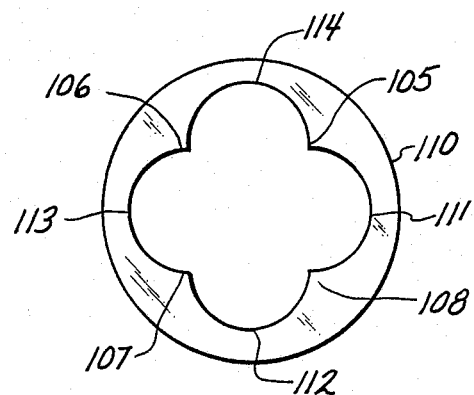

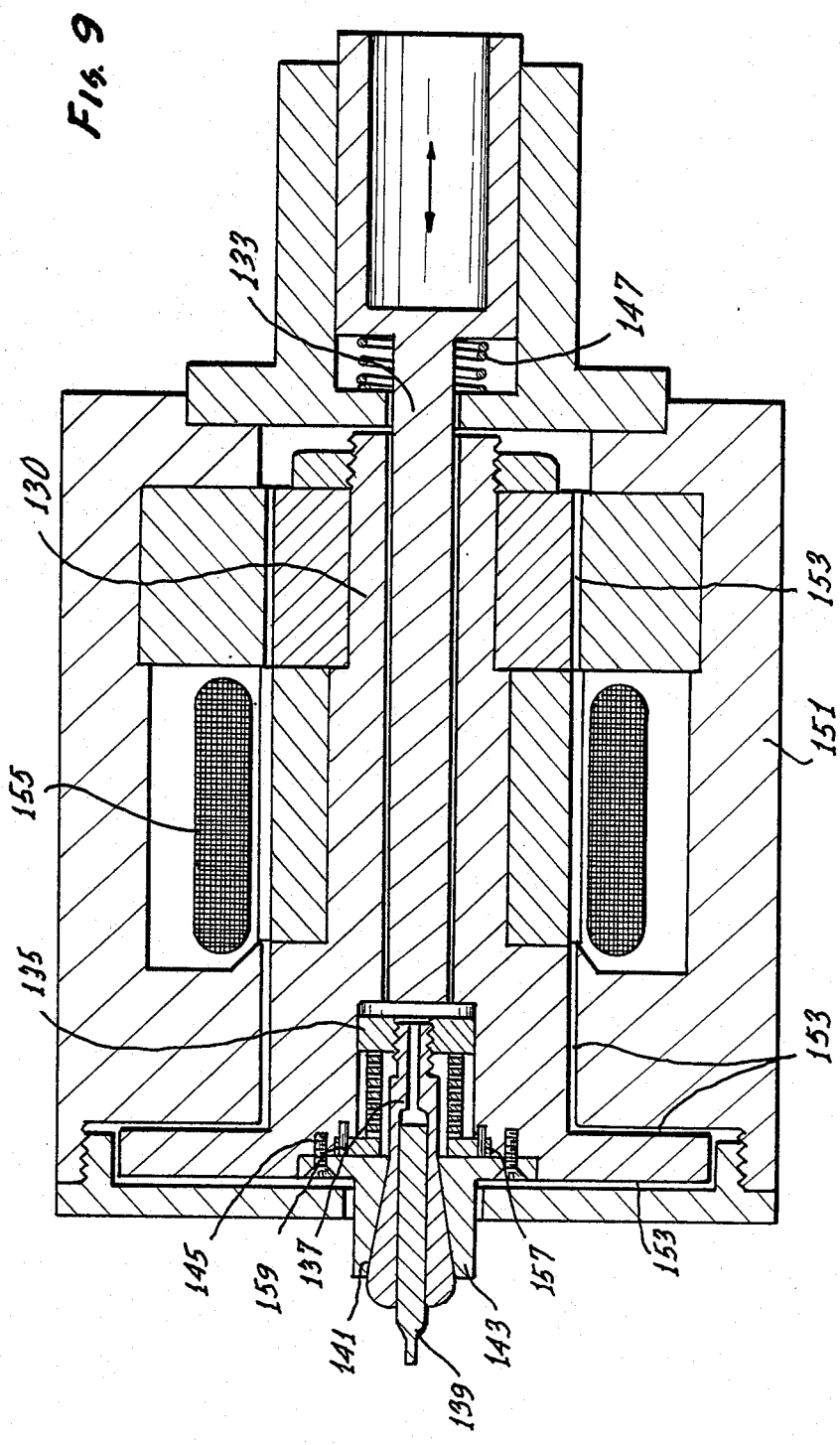

INTEGRAL SPRING FLEXURE FOR USE WITH HIGH SPEED ROTATING SHAFTS

RELATED APPLICATIONS

This application is a continuation-in-part of Application Ser. No. 06/635,716 filed on July 30, 1984, now U.S. Pat. No. 4,640,653.

FIELD OF THE INVENTION

The present invention relates to an integral one piece spring and more particularly to an improved integral one-piece spring especially adapted for use at relatively high rotational speeds, for example, for use in a relatively high speed spindle having an accurate axis of rotation.

BACKGROUND OF THE INVENTION

Flexures are used to connect two members of a system between which a relatively small movement is required. This method of construction has a great advantage of simplicity, coupled with complete freedom from friction and backlash, which are very detrimental to the performance of said system.

The great advantage of the flexure lies in the absence of sliding parts. Consequently, there is no need of lubrication. Neither friction nor wear occur, and dirt, if any, does not cause trouble.

The use of an arrangement in which the shaft, drawbar and restoring spring are essentially one, minimizes any relative positional change during and after operation.

In recent years, with development of computer controlled numeric machines, a great need has arisen for very accurate spindles for use in drilling, milling grinding, dicing, and other machining-type operations. With the greater use of new types of cutting materials such as tungsten carbide, aluminum oxide, and other ceramics which are now being utilized in cutting tools, increasingly higher speeds are desired. However, most, if not all of these new materials are brittle, and therefore it is desirable to minimize any shock associated with high speed rotating cutting tools. Moreover, in certain types of drilling operations, rotational speeds up to about 120,000 rpm are used and under circumstances in which the rotation of the spindle must be extremely accurate.

The desirability of obtaining the lowest possible tool shock and high accuracy dictates a spindle design which obtains and maintains an accurate axis of rotation which does not deviate during operation. Low spindle vibration is also desirable for the same reasons.

One of the difficulties with machined integral springs is that there is a tendency, after extended cycles of compression and relaxation, or elongation and relaxation, for certain portions of the structure to exhibit fatigue failure. Since the advantages of a machined spring, as herein described for the purposes described, are significant, experimental testing has indicated that the life of the spring may be extended significantly if the stresses in the spring structure can be more uniformly distributed.

Thus, for example, the spring structure of the previously filed application above identified operates in a manner which is quite acceptable. The improved structure of this invention constitutes an improvement in the structure previously described and is believed to represent an improvement generally in the structure of integral machined one-piece springs.

In effect, the improvements of this invention relate to a structure in which the stresses are more evenly distributed so as to assure essentially an even stress distribution in the spring structure. As will be described in detail, this structure involves modification of the slot widths in selected regions of the spring and providing controlled radial dimensions of the lands so that the spring is not subject to high localized and uneven stresses which tend to promote failure at certain regions of the spring. The result is a much improved machined spring structure having use in a much wider field than merely relatively high speed spindles.

Further details of these and other novel features of the invention including, for example, its structural and method cooperation with other system embodiments, as well as additional objects and advantages of the invention and their principles of operation will become apparent and be best understood from a consideration of the following description, when taken in connection with the accompanying drawing, which is presented by way of an illustrative example only.

BRIEF DESCRIPTION OF THE DRAWINGS

FIG. 2 is an illustrative view showing the construction of said integral spring;

FIG. 2a is a view in perspective of an integral spring in accordance with the present invention in which the slots are radiused;

FIG. 2b is an illustrative view showing the spring nut in relationship to the drawbar and collet assembly;

FIG. 2c is a view in perspective of a form of integral spring in accordance with this invention;

FIG. 3 is a cross-sectional view showing the design and construction of an alternate method of design of said integral spring;

FIG. 3B shows the view A—A of FIG. 3;

FIG. 4 is a view in perspective of another form of integral spring in accordance with the present invention;

FIG. 5 is an enlarged fragmentary view of a portion of the integral spring of FIG. 4;

FIG. 5a is a plan view, for purposes of illustration, of an integral spring in accordance with this invention;

FIG. 6 is a diagrammatic view illustrating the stress distribution over the solid beam portion of the integral spring;

FIG. 7 is a plan view of the underside of an integral spring of the present invention illustrating one of the features previously illustrated diagrammatically in FIG. 6;

FIG. 8 is a view in perspective of a spring in accordance with this invention for use in a high speed spindle; and FIG. 9 is a view partly in section and partly in elevation of an improved spindle in accordance with this invention in which a non-rotating actuating rod is used.

DETAILED DESCRIPTION OF THE INVENTION

Most of the mechanisms that rotate with said spindles use springs to either bias or retain pressure or force for holding the tools by means of collets, chucks, or other such devices.

A major advantage of this spindle design is that all of the individual parts return to their respective positions with a minimum of deviation after each actuation, so as to prevent or minimize the occurrence of out-of-balance forces.

The type of spring best suited for this application is one that is of the integral machine type as shown in FIG. 2.

This type of spring can not only be designed to have the desired or required spring characteristics, but is also a true flexure integral with the assembly. It therefore minimizes any geometric change, and prevents out-of-balance forces due to the shifting of the part's position.

Another type of spring which also meets the above requirements is of the metal bellows type as shown in Figure 3. This type of construction also provides a true flexuring device, thus again minimizing any geometric change from its original position after actuation.

Figure 1:
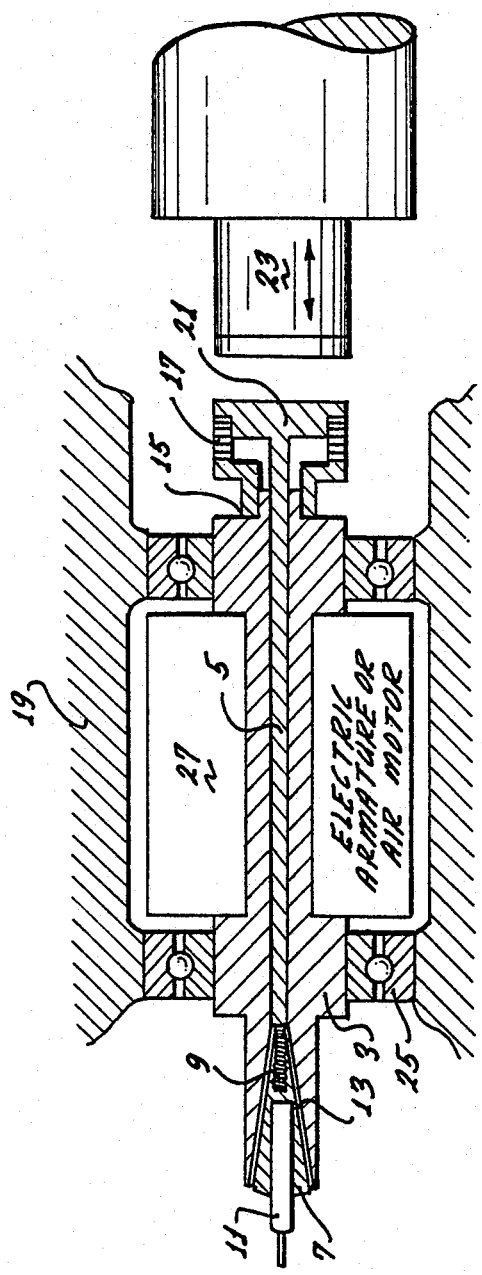
FIG. 1 is a cross-sectional drawing showing the structural relationships of the major components in accordance with the principles of the present invention.
Figure 1:
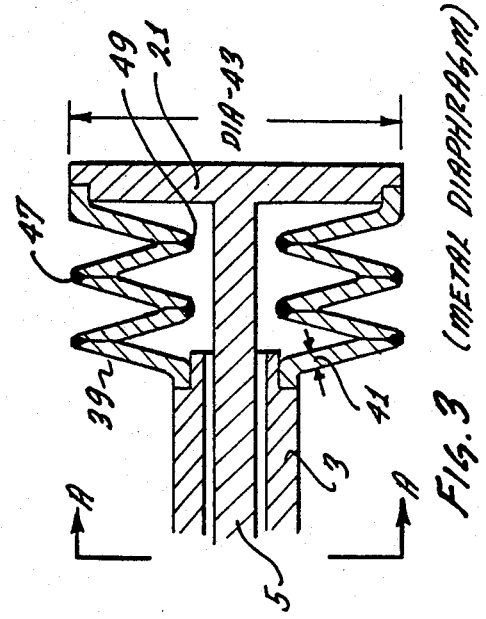

FIG. 1 shows such a spindle design in which the shaft 3 is hollow so as to allow for the use of a drawbar 5. Said drawbar 5 is attached to collet 7 by means of threads 9. Collet 7 is contracted around tool 11 by means of its tapered surface 13 and corresponding tapered surface in shaft 3. Drawbar 5 is kept in tension by integral machine type spring 17 located at the opposite end of shaft 3. Spring 17 is constrained by shaft 3 at point 15 on one end, and head 21 of drawbar 5 at its other end. Drawbar 5 is actuated by force applied to its head 21, which is supplied by any means, located at point 23, such a pneumatic, hydraulic, magnetic, or electrical/electro-mechanical. Shaft 3 is maintained in a true concentric position relative to housing 19 by a bearing system 25. Shaft 3 is powered by any desired means 27, such as an electric motor, pneumatic motor, hydraulic motor, or various types of turbines. The spring rotates with the shaft 3 and may be attached at 15 by keys, splines, screw threads, or by virtue of the spring biased engagement between the spring and the shaft.

As can also be seen in FIG. 1, a drawbar system is utilized to actuate the collet or chuck. An integral spring nut assembly is used to close the chuck and maintain the required force to hold the tool bit in the collet or chuck. The spring nut is machined with slots to generate the required geometry for creating the spring and is made in one piece. The one piece construction minimizes moving parts and eliminates the movement of any of the rotating parts relative to each other. This feature assures that no out-of-balance condition, nor shifting of the true mass axis with the geometric axis will occur during operation. This feature maintains the best concentricity and insures a minimum of vibration during operation.

FIGS. 2, 2a, 2b and 2c show that the construction of the integral spring nut 17 is obtained by machining alternate layers of slots 29 partially through a tubular cross section 31. The solid interconnecting section 33 of each alternate layer are disposed an equal number of degrees apart, for example, 90 degrees apart so as to maintain the integrity of said spring. The thickness of each spring member 35 and wall thickness of the tubular cross section 31 determine the stiffness and stress level of each spring member or lands 35. The number of slots 29 or number of spring members 35 in conjunction with the thickness and diameter of the tubular cross section determine the spring stiffness. The desired spring characteristics can thus be obtained to hold collet 7 around tool 11 within shaft 3 by the force applied by said spring nut 17.

FIG. 3 shows an alternate integral spring nut design which is comprised of metal diaphragms 39. Said diaphragm's thickness 41 and diameter 43 determine the stress levels and force load characteristics. The number of said diaphragms 39 also determines the overall spring stiffness. Each diaphragm can be separately manufactured and joined by welding, brazing, or any other suitable means at their respective outer circumference 47 and inner circumference 49.

FIG. 3B shows another alternative to the design of the type of integral spring nut as described in FIG. 3. Here, notches 51 are utilized to decrease the spring stiffness and minimize stress in said diaphragms 39. The inner circumference 49 is still completely welds or joined as described in FIG. 3. The outer circumference 47 is now only joined with each alternate diaphragm between each notch as shown.

It is also possible to manufacture this type of spring nut flexure in one piece by hydraulically forming or die rolling a tube on a mandrel.

The structures above described operate quite satisfactorily although over extended periods of time, there may be fatigue which causes failure of the spring. In general, the presence of unequal stresses tends to cause localized fatigue and may result in spring breakage. It has been observed that if the stresses are localized or unequal, continued stresses as a result of continuous flexure tend to cause fracture and destruction of the spring.

Referring to FIG. 4 an improved form of integral spring 60 is illustrated as being hollow and generally cylindrical in shape and including spaced end faces 62 and 63. The wall 65 of the spring between the end faces 62 and 63 includes a plurality of tiered slots 66 and tiered lands 68, the slots and lands extending circumferentially, as shown. The number of tiers may vary depending upon the strength and length and other characteristics desired in the spring while the circumferential dimension of each of the slots and lands may vary, again depending on the characteristics desired in the spring.

As shown, by way of example in FIG. 5, each slot tier includes two slots 71 and 72 and two circumferentially spaced solid sections 73 and 74 between the slots. Thus, if one traces circumferentially around a tier, there is a slot 71, a solid section 73, a second slot 72 and a second solid section 74 opposite 73, as seen more clearly in FIG. 4. The junction between the slot and the associated solid section is radiused as indicated at 75 to reduce stress and to minimize fatigue at the junction of the solid section and the slot.

The land tier 68 includes a plurality of circumferentially extending lands 76 located between the axially spaced slots. Generally, the circumferential land 76 is one-half the circumferential dimension of the slot, i.e., there are twice as many lands in a tier as there are slots. For example, in a structure which has two slots per tier, there are two solid sections which form four circumferentially extending lands. It is to be understood that the number of slots and lands in each tier may also vary for example three or four or more slots and double the number of lands depending upon the characteristics desired in the spring.

In the form illustrated for purposes of explanation, the slots of each tier are opposite to each other while the cooperating lands of each tier are also opposite to each other as illustrated. In the case of three slots and lands, there is a slot opposite a land, but the slots and lands are disposed at 120 degrees to each other. The respective tiers are arranged such that as one traces axially of the spring, there is a slot, with a land below it and a slot below the land, or there may be a land, with a slot below it with a land below the slot.

In the illustrated form, as shown in FIG. 5a, the use of two slots and two solid sections provides four lands in each of the respective land tiers resulting in the formation of four lobes 80, 81, 82, and 83 disposed at 90 degrees with respect to each other. Thus lobes 81 and 83 are formed by the solid sections of one slot tier and lobes 80 and 82 are formed by the solid section of another tier, above or below the one tier. It is to be understood that the number of lobes depends upon the number of slots and the solid sections in each slot tier. Generally, the number of lobes is related to the number of solid sections in each tier and the number of solid sections is directly related to the number of slots, which may vary in accordance with the limits herein described.

In the usual mounting of the spring 60 the end faces 62 and 63 are fixed during flexure in that they are in contact with a support surface or element. Thus, the end faces do not move because they are fixed. Since the end faces are fixed, this has an effect on the regions of the spring which are subject to possible fatigue failure. More specifically, the land on each side of a slot each tends to move one half of the axial width of the slot. If the slot associated with the end faces were a full width, then the top and bottom lands would tend to move more than one half the slot width thus tending to induce premature fatigue in the top and bottom lands.

To reduce this potential for fatigue, the axial width of the slot at the top and bottom is one half of the axial width of the slots between the top and bottom as seen in FIG. 5. The top slot 85 and the bottom slot 88 are each of a predetermined dimension which is less than the predetermined axial width dimension of the slots therebetween, and preferably one half the axial width of the slots 90, 91 which are between the end slots. In this way, it is assured that the top and bottom lands cannot move more than a distance amounting to about one half of the normal slot width.

In the structure of the spring described in the previously filed application already identified, the slot associated with the top and bottom lands were of the same predetermined axial width dimension as the remaining slots. In effect, data collected through testing indicated that the top and bottom lands were capable of moving axially more than one half the axial slot width, while the lands between the end lands were capable of moving about one half of the slot width.

Since the top and bottom lands were moving axially more than half the slot width and the lands between the end lands were moving a maximum of one half the slot width, the end lands were being stressed greater than the lands between the end lands. Actual experimental performance data confirmed that after prolonged cycling one of the top or bottom or both lands tended to fail due to greater stresses as compared to the lands between the end lands.

In accordance with one aspect of this invention, the stresses may be more evenly distributed across all of the lands of the spring in an integral machined spring if the slots adjacent to and immediately below or above the end lands are dimensioned such that their predetermined axial width is less than the predetermined axial width of the remaining slots between the end lands. In accordance with this invention, the end slots each are of a predetermined axial width which is less than the predetermined axial width of the slots between the endmost slots, and preferably one half the axial width dimension of the remaining slots. In this way, the end lands cannot move more than one half the slot width since the slot associated with the top and bottom lands is one half the width as compared to the remaining slots.

Another source of fatigue failure is the land itself. Referring to FIG. 6, a land 100 is shown as a solid beam between adjacent slots. In movement, the center section 102 is least stressed as compared to the end sections 103 and 104. Again, in order to compensate for the uneven stress distribution which tends to produce fatigue, the lands are uniquely configured.

Referring to FIG. 7, the lobes are thicker in radial cross section at the region where the lands join the body than in the region between the lobes. Thus, for example, a four lobe configuration is shown including lobes 105, 106, 107, and 108, each having a radial dimension to the outer surface 110 which is greater than that of the pockets 111, 112, 113 and 114 between the lobes. The adjacent pairs of lobes, e.g., 105–106 represent the ends of a land 103 and 104, while the pocket 114 represents the mid-region 102 of a land 100.

It can thus be seen that in radial dimension, each land is configured such that the ends 103 and 104 are of a maximum radial dimension while the center 102 is of a lesser radial dimension. The portion between the center and each end of each land represents a transition zone in which the radial dimension changes from a maximum to a minimum dimension. In this way, the portion of the lands which is stressed more is thicker in radial dimension than the portion of the land which is least stressed. The result is that the stresses are uniformly distributed by having the more stressed areas thicker radially than the least stressed intermediate regions.

It is apparent that the same construction may be used in other than four lobe systems. It is also apparent that the dimensions may be calculated from spring calculations to provide a spring of a predetermined spring characteristic, as is well known in the art. It is also apparent that the fabrication of the spring is relatively simple. More specifically, the slots are cut to provide the slots and lands, the top and bottom slots preferably being one half the axial dimension of the slots between the end slots. Thereafter the pockets are formed, as for example drilling or otherwise machining the pockets at the regions of the cylinder which form the ends of the lands.

While the lobes and pockets are illustrated as generally circular is section, this is done for symmetry and symmetrical stress distribution and is the preferred form. It will be apparent that other forms may be used depending upon the stress condition and the use of the spring. It is also apparent that the lobes may be formed on the outer surface rather than the inner surface as illustrated in the representative drawing.

FIG. 8 illustrates a spring 120 as described with respect to FIGS. 4–7 in which an integral nut 125 is provided on one end 127 of the spring. This particular structure may be used in a spindle as already described, or in other forms of spindle assemblies.

FIG. 9 illustrates a high speed spindle assembly in which a shaft 130 in the form of rotor is hollow through the center to allow the use of a non-rotating actuator rod or push bar 133 located in the center aperture of the rotor. Located to the front of the front end of the push bar 133 and arranged concentrically therewith is an integral machined spring 135 which may be any of the machined springs already described. The machined spring 135 maintains a collet 137 in contact with the shaft 130. For example, the collet 137 may be screwed or otherwise fixed to the machined spring 135.

The collet is contracted around a tool, indicated at 139 by the tapered surfaces 141 in the collet holder 143 which is non-rotating relative to the shaft 130 and affixed thereto by screws 145 although one may use other affixing means. The tool 139, the collet 137 and the collet holder 143 rotate with the shaft 130. The non-rotating bar 133 may be actuated axially through the shaft 130 by any one of several different means such as a magnetic force, or pnuematic force or the like to actuate the collet for a change of tools. The tool is secured in the collet by the spring force of the machined spring 135 since the push bar 133 is normally biased away from the machined spring by a spring mechanism 147 which urges the push bar away from the machined spring, as shown. To change a tool, the push bar is urged towards the machined spring to urge the collet axially to release the tool and spring biased by the machined spring into the tool lock position.

The shaft 130 is mounted in a true concentric position relative to a housing 151 by a bearing assembly schematically illustrated at 153. The bearing assembly also includes a bearing mechanism along the lateral face of the shaft, also indicated at 153. The shaft may be rotated by any desired means 155, which in the form illustrated may be an electric motor having the armature on the shaft and the stator 155 supported by the housing. It is understood that the motor may be a pneumatic motor or a hydraulic motor or any one of several different types of turbines. Since the machined spring is mounted on the shaft 130 as indicated at 157 through the use of pins 159 or the like, it rotates with the shaft.

As is apparent from FIG. 9, the actuating or push rod 133 is non rotating but is axially moveable relative to the housing and is used to actuate the collet when the shaft 130 is not rotating in order to effect a tool change. As already described, the use of an integral spring nut operates to keep the collet closed to maintain the tool in the collet. Since the collet, tool and integral spring nut rotate at relatively high speeds, the advantages already described are obtained. Thus, the use of a one-piece integral machined spring minimizes moving parts and eliminates the movement of the rotating parts relative to each other, especially radial movements. This structure assures no out-of-balance conditions, and assures that there is not shifting of the true mass with respect to the geometric axis during high speed rotation.

There have thus been disclosed and described various structural means and examples of a new spring nut flexure for use in high-speed rotating shafts which achieve the objects and exhibit the advantages set forth herein and above.

The embodiments of the invention in which an exclusive property or privilege is claimed are defined as follows.

I claim:

1. An integral machined spring assembly comprising:
   spring means including a cylindrical body member having spaced end faces,
   said cylindrical body member including wall means between said end faces,
   said wall means including a plurality of tiered slots and lands and solid sections located between said slots,
   said slots and solid section extending circumferentially of said body and said slots alternating with a solid section,
   said slots being disposed such that there is at least one land disposed axially with respect to said slot,
   said end faces including an adjacent slot with the remainder of said slots being disposed between said adjacent slots,
   the remainder of said slots having a predetermined axial width dimension, and
   said adjacent slots having a predetermined axial width dimension which is less than the predetermined axial dimension of the remainder of said slots.

2. An integral machined spring assembly as set forth in claim 1 wherein the predetermined axial width of said adjacent slots is one half the predetermined axial width of the remainder of said slots.

3. An integral machined spring assembly as set forth in claim 1 wherein the junction between a slot and a circumferentially adjacent land is radiused.

4. An integral machined spring assembly as set forth in claim 1 wherein the radial dimension at said solid section is greater than the the radial dimension between said solid section.

5. An integral machined spring assembly as set forth in claim 1 wherein an integral nut is provided on at least one of said end faces.

6. An integral machined spring assembly as set forth in claim 1 wherein each said land includes a center section and end portions, and
   the center section of each said land having a radial dimension less than the radial dimension of the end portions of said land.

7. An integral machined spring assembly as set forth in claim 1 further including means to interconnect said spring means to drawbar means.

8. An integral machined spring assembly as set forth in claim 7 wherein said drawbar means is mounted in a support structure, and
   said spring means being disposed in concentric relation to said drawbar means.

9. An integral machined spring assembly comprising:
   spring means including a cylindrical body member having spaced end faces,
   said cylindrical body member including wall means between said end faces,
   said wall means including a plurality of tiered slots and lands,
   said slots and lands extending circumferentially of said body and said slots alternating with a land,
   said slots being disposed such that there is at least one land disposed axially with respect to said slot,
   said end faces including an adjacent slot with the remainder of said slots being disposed between said adjacent slots,
   the remainder of said slots having a predetermined axial width dimension,
   said adjacent slots having a predetermined axial width dimension which is less than the predetermined axial dimension of the remainder of said slots,
   the intersection of said lands and said slots forming a plurality of circumferentially disposed lobes with pockets between said lobes, and
   the radial dimension of said lobes being greater than the radial dimensions of said pockets.

* * * * *